United States Patent
Huber

(10) Patent No.: US 7,606,931 B2
(45) Date of Patent: Oct. 20, 2009

(54) METHOD WITH WHICH A FIRST APPLICATION CAN ACCESS COMPONENTS OF A SECOND APPLICATION OVER A LOGICAL INTERFACE

(75) Inventor: Adriano Huber, Locarno (CH)

(73) Assignee: Swisscom Mobile AG, Bern (CH)

( * ) Notice: Subject to any disclaimer, the term of this patent is extended or adjusted under 35 U.S.C. 154(b) by 1375 days.

(21) Appl. No.: 10/150,210

(22) Filed: May 16, 2002

(65) Prior Publication Data

US 2002/0199027 A1 Dec. 26, 2002

Related U.S. Application Data

(63) Continuation of application No. PCT/CH99/00552, filed on Nov. 19, 1999.

(51) Int. Cl.
*G06F 15/16* (2006.01)
(52) U.S. Cl. .................. 709/236; 709/203; 235/492
(58) Field of Classification Search ............... 709/236, 709/203, 310; 380/25; 455/557, 558; 235/492
See application file for complete search history.

(56) References Cited

U.S. PATENT DOCUMENTS

| | | | |
|---|---|---|---|
| 5,559,802 A * | 9/1996 | Robinson et al. .......... 370/469 |
| 6,005,942 A * | 12/1999 | Chan et al. .................. 713/187 |
| 6,195,700 B1 * | 2/2001 | Bender et al. ............... 709/230 |
| 6,385,729 B1 * | 5/2002 | DiGiorgio et al. .............. 726/9 |
| 6,481,632 B2 * | 11/2002 | Wentker et al. ............. 235/492 |
| 6,523,754 B2 * | 2/2003 | Hoshino et al. ............. 235/492 |
| 6,549,773 B1 * | 4/2003 | Linden et al. ............ 455/426.1 |
| 6,807,561 B2 * | 10/2004 | Lagosanto et al. .......... 709/203 |
| 6,845,498 B1 * | 1/2005 | Odinak et al. ............... 717/100 |

FOREIGN PATENT DOCUMENTS

EP  0 627 835 A  12/1994
EP  0 652 666 A   5/1999

* cited by examiner

*Primary Examiner*—Tonia L Dollinger
*Assistant Examiner*—Kyung H Shin
(74) *Attorney, Agent, or Firm*—Pearne & Gordon LLP

(57) ABSTRACT

Method with which a first application, for example in a mobile telephone, can access components in a second application, for example a chip card, for which no standardized data unit has been defined in the logical interface between said applications.

For this purpose, the first application sends a misused standardized data unit to said second application. The second application recognizes that said data unit has been misused and accordingly makes available said component.

56 Claims, 5 Drawing Sheets

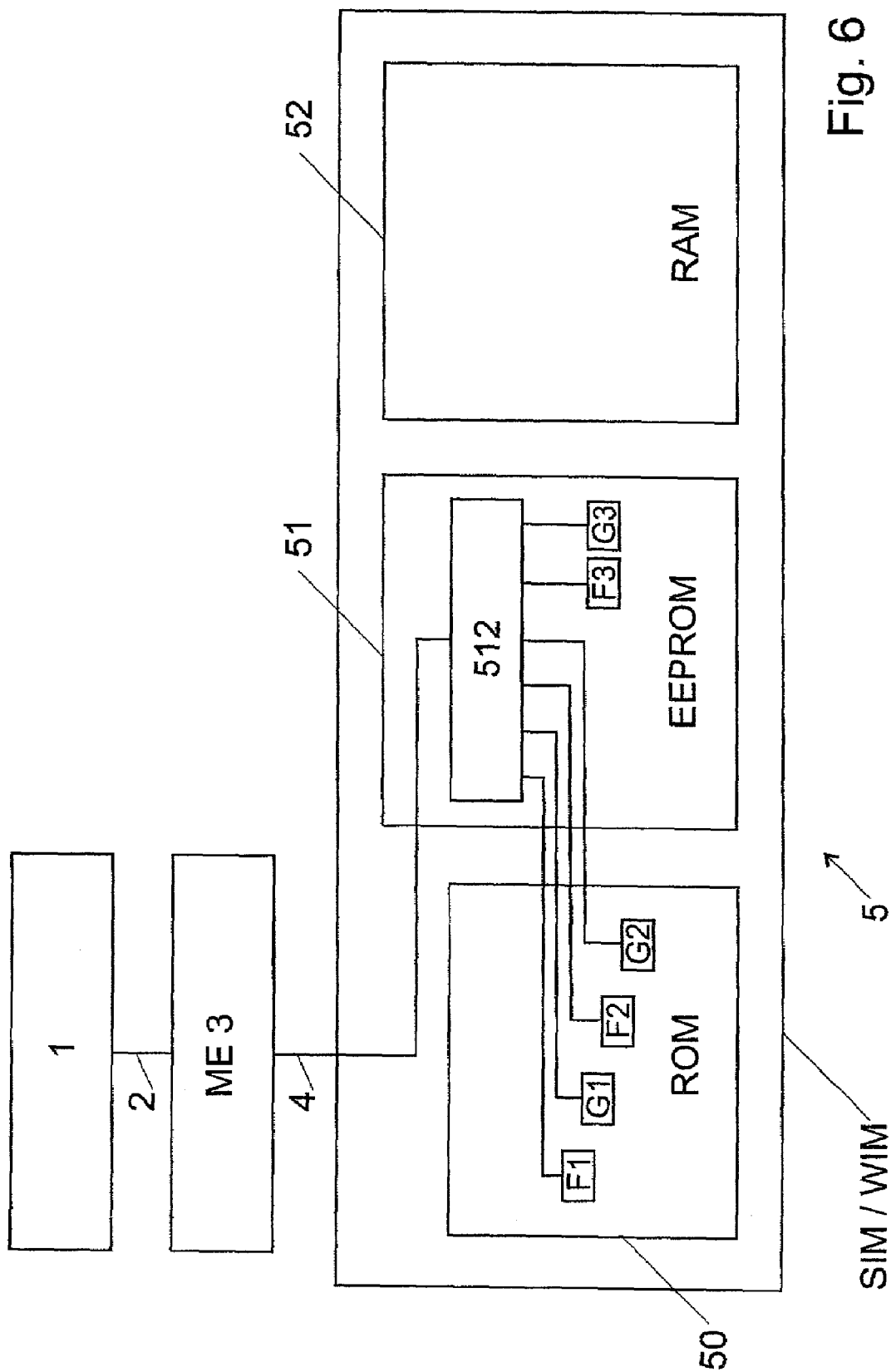

METHOD WITH WHICH A FIRST APPLICATION CAN ACCESS COMPONENTS OF A SECOND APPLICATION OVER A LOGICAL INTERFACE

The present application is a continuation of application PCT/CH99/00552 filed on Nov. 19, 1999, of which the content is included by reference.

FIELD OF THE INVENTION

The present invention concerns a method with which a first application can access components of a second application over a logical interface, even if no data unit is provided for accessing these components in the communication protocol between both applications.

RELATED ART

Different applications, in particular software applications, can communicate with one another over a logical interface called API (Application Protocol Interface). When the first application wants to access a component of the second application in order for example to execute a function $x=F(P1, P2)$, it sends an order over this API interface. The second application receiving the order can decode it and execute the corresponding function F. For example, the second application can transmit a reply to the first application over the API interface.

Such orders and replies are usually encoded as structured data units, called APDU (Application Packet Data Unit). An APDU consists usually of a header and a body, the header indicating the instruction to be performed and the instruction parameters whilst the body, which is not always present, contains data. This protocol is described among others in the ISO norm ISO/IEC 7816, part 4. Further orders are specified in system specific documents (e.g. GSM 11.11, GSM 11.14).

This mechanism is used among others for accessing components that are provided by applications in chip cards. In this manner, an application in a mobile telephone, for example a browser application, can for example access components, for example security functions F, that are provided by a chip card in the mobile telephone. The same mechanism is however also used for communication between other applications in other devices.

The definition of the API interface and the standardization of the APDU so as to be recognized by chip cards are developed mainly in standardization forums or are proposed by individual firms. For reasons of compatibility between applications of different providers, among others between chip cards and mobile telephones of different manufacturers, a strong international standardization of the API interface is a desirable aim.

The standardization of APDU orders is however a process that often happens more slowly than the technical development of the applications. For this reason, in particular conventional chip cards cannot fulfill all the wishes of the users and in particular not all the wishes of the services providers or of telecommunication network operators. Functionalities of a chip card that can technically already be realized and are even sometimes implemented in the card can often be offered only after the next standardization of the APDU specification.

It is therefore an aim of this invention to propose a method with which a first application can access components, for example software functions, of a second application, even if no APDU is provided in the API interface.

It is a further aim of the invention to propose a chip card that can make available new components without new APDU orders therefor having to be standardized.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved in that a first application sends a misused standardized data unit to a second application and in that said second application recognizes that said data unit has been misused and accordingly makes available said component.

Standardized data units, for example APDU, are for example misused by providing them with special parameters, for example with impossible or very improbable parameters in the header. Misused APDU can however also be indicated by an alteration in the body part.

DESCRIPTION OF THE DRAWINGS

Hereafter, preferred embodiments of the invention will be described in more detail with the aid of the attached figures, in which:

FIG. 6 shows a diagrammatic view of a system with a chip card according to a fourth embodiment of the invention.

DETAILED DESCRIPTION OF THE INVENTION

Although the following description explains only the special case of an API interface between a first application in a mobile telephone and a second application in a chip card, the one skilled in the art will understand that the present invention can also be used for other API interfaces between any possible applications.

In particular, the following description refers to the special case of a chip card that is used as an identification module in a digital cellular mobile telephone, for example a SIM (Subscriber Identification Module) card or a WIM (Wireless application protocol Identification Module) card that can be used for example in a GSM (Global System for Mobile Telecommunication), WAP (Wireless Application Protocol) or UMTS mobile telephone. The one skilled in the art will however understand that the present invention can also be applied to other types of chip cards, for example with JAVA (trademark of SUN Microsystems) or with OpenCard cards.

Figure 1:
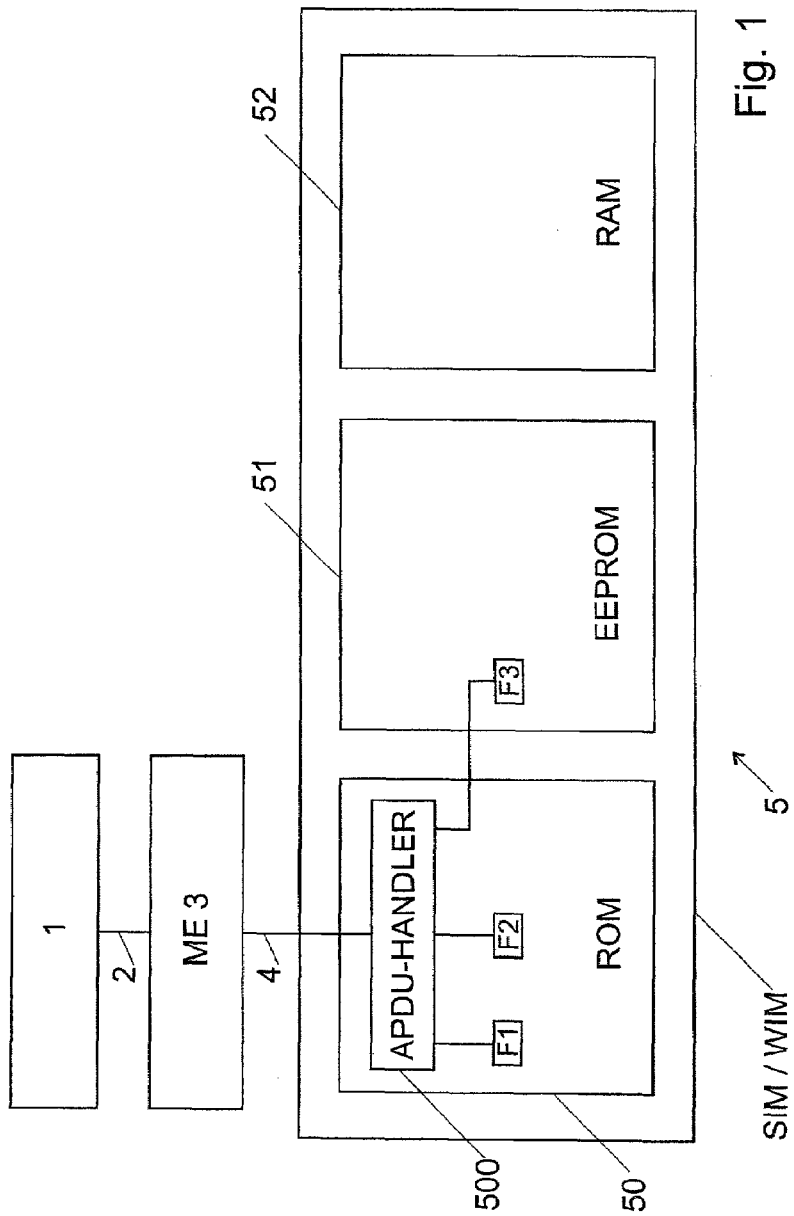
FIG. 1 shows a diagrammatic view of a system with a convention chip card.

FIG. 1 shows diagrammatically an example of a conventional system with an API interface 2, 4. The system comprises a terminal 3 (Mobile Equipment ME) and a conventional SIM and/or WIM card 5. An application 1, for example a browser or an application program, for example a program from a service provider, is executed by data processing means (not represented) in the mobile equipment 3. The application 1 communicates with the mobile equipment 3 over an API (Application Protocol Interface) 2 that is here not detailed.

The mobile equipment 3 communicates with the SIM card 5 over another API interface 4. The mobile equipment 3 usually takes over the role of master of the communication over this interface whilst the SIM card 5 answers as slave.

Protocol variants are however also known (for example according to SIM-Toolkit, i.e. GSM 11.14) in which the SIM card takes over, at least temporarily, the role of master.

A step in the API protocol consists in an order being sent to the chip card 5, in the card executing the order and if necessary in a reply being sent to the mobile equipment 3 and then forwarded to the application 1. Thus either orders or replies are exchanged over the interface 4. Parameters can be contained both in the orders and/or in the replies.

These questions and orders are encoded with standardized APDU (Application Protocol Data Unit). Some standardized APDU for ISO chip cards are described in the norm ISO/IEC 7816-4:1995(E). Additional APDU have been defined for SIM cards and for WIM cards in order to expand the functionalities of the API interface 4.

Figure 2:
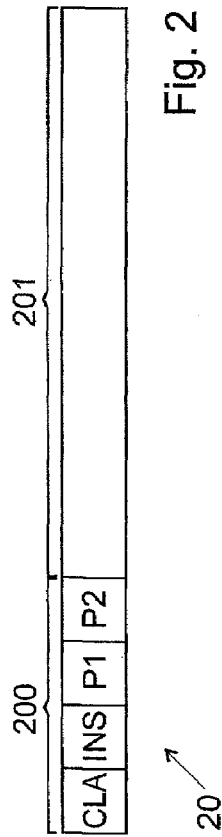
FIG. 2 shows a diagrammatic view of an APDU order according to the invention.

FIG. 2 shows the typical structure of an APDU 20. The data unit comprises a compulsory header 200 with four bytes and an optional body 201 of variable length.

The header contains a first byte (CLA) used to indicate among others which API version the data unit complies with. A second byte (INS) gives the instruction that is to be executed or has just been executed by the chip card 5. Depending on the instructions, two further parameters P1 and P2 can be indicated. If an instruction does not require a parameter P1 and/or P2, this parameter must be set to zero.

The optional body 201 contains data and at least one byte indicating the length of these data and/or the maximal length of the expected reply.

The conventional chip card 5 comprises generally a ROM 50, an EEPROM 51 and a RAM 52, as well as data processing means (not represented). The ROM nowadays typically has 64 Kbytes and usually includes the operating system, a Java virtual machine (JVM, trademark of SUN Microsystems) and different components F1, F2, . . . , for example JavaBeans, applets or programs that can execute different functions F. Components are also stored in the EEPROM 51, for example components that have been downloaded as applet after the personalization of the card as well as personal user data, for example a telephone directory, an electronic certificate, profile-relevant information, etc. The EEPROM can for example comprise 16 or 32 Kbytes. Temporary data are stored in the RAM 52, for example temporary variables. Applications and applets can further be stored in the EEPROM.

A data unit handler 500, often called APDU handler, receives the APDU of the mobile equipment 3 received over the API interface 4 and analyses the header 200, in particular the bytes CLA and INS, in order to forward the order to the corresponding component F1, F2, . . . that can execute the order. The APDU handler 500 can then receive the reply of this component and send this reply over the API interface 4 to the mobile equipment 3.

The APDU handler 500 is usually implemented in the ROM part 50. A problem with this configuration is that the mobile equipment 3 and the application 1 cannot access new components G1, G2, G3 in the card, for example in the ROM, EEPROM or RAM, as long as no APDU 20 has been standardized for accessing these components. Even when such an APDU has been defined and standardized, chip cards 5 that have already been distributed cannot make available new components G1, G2, G3 included in the card if they only have a conventional APDU handler 500 unable to recognize this APDU that has been defined later. For these reasons, new functionalities that would be possible through the continuous and fast development of chip cards can be distributed only slowly.

Figure 3:
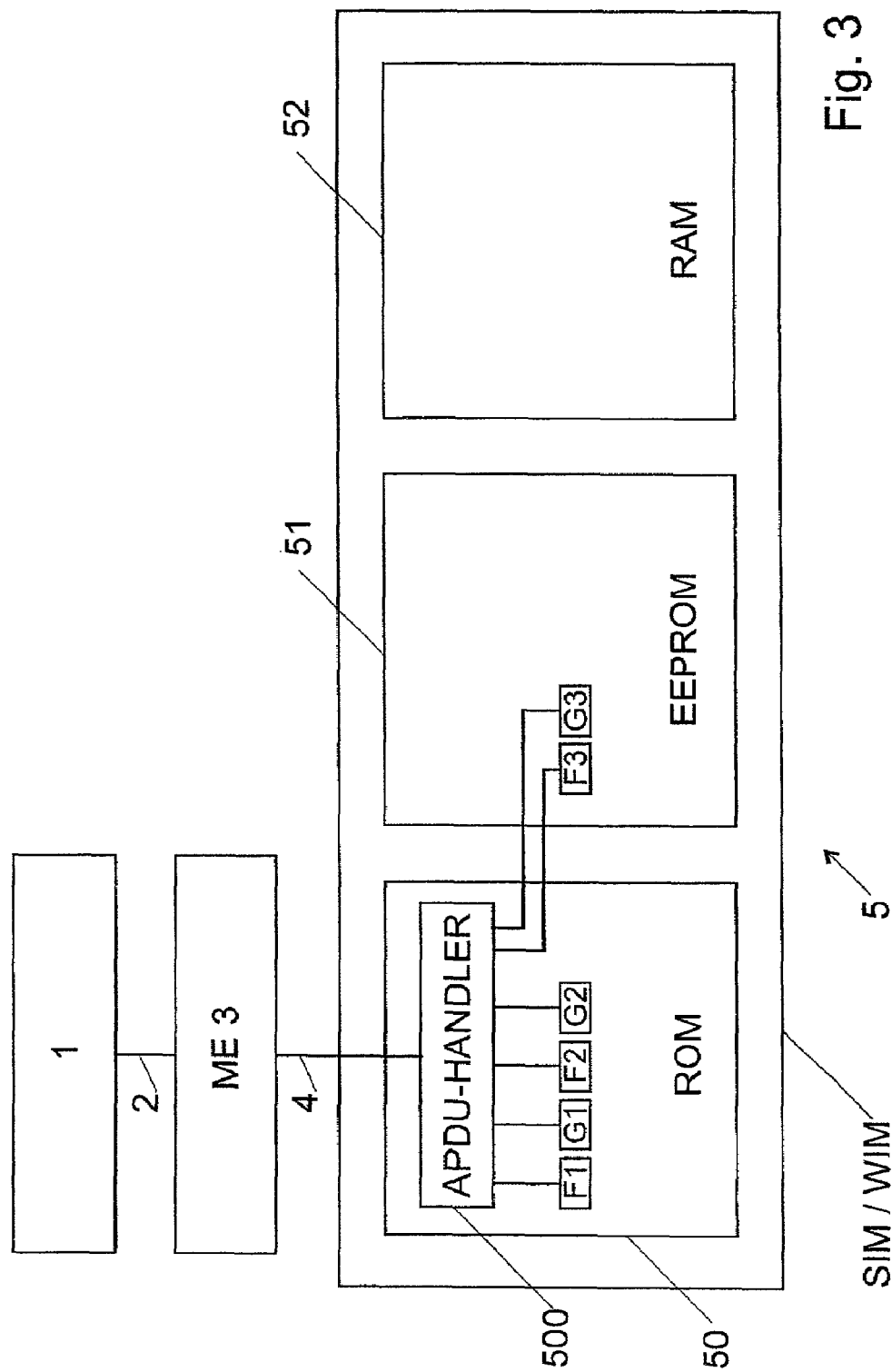
FIG. 3 shows a diagrammatic view of a system with a chip card according to a first embodiment of the invention.

FIG. 3 shows an example of a first embodiment of a chip card 5 according to the invention, for example a SIM or WIM card that can solve these problems. The same or similar features are referred to in all figures with the same reference numbers and will not be described again unless this is necessary.

In this embodiment, the application 1 is programmed so that it forwards misused APDU to the mobile equipment 3 in order to access the components G1, G2, G3 in the card 5 for which no APDU has been standardized. These misused APDU are received by the mobile equipment 3 and forwarded over the interface 3 of the card 5.

The APDU handler 501 in the card has been modified so that it can recognize these special, misused APDU and forward them accordingly to the new components G1, G2, G3 . . . .

The application 1 can misuse APDU in several ways in order that the modified APDU handler 501 can recognize them.

It would theoretically be possible to manipulate the bytes CLA and/or INS of the header 200 so that they correspond to no API version or to no standardized instruction. This embodiment is however not preferred because of the risk of conflicts with new developments of the API protocol.

Instead, in a preferred embodiment of the invention, standardized APDU, i.e. existing CLA and INS bytes, are used for existing functions x=F(P1, P2) and provided with non-coherent or not tolerated parameters P1, P2. For example, an APDU can be misused by indicating parameters when no parameter is required. APDU can also be misused by indicating parameter values for P1 and/or P2 that are either impossible, unexpected or very improbable. This embodiment has the advantage that the length of the APDU is not modified and the misuse is easily detected since only one or two bytes have to be decoded.

If the called-up new components G1, G2 or G3 in the chip card require parameters, the latter can be packaged in P1 and/or P2. A conversion program in the application 1 performs the necessary parameter format adaptations, for example if the new components G1, G2, G3 require binary data and the misused APDU only accepts ASCII codes.

In another variant embodiment of the invention, the header 200 is not altered in any way and can thus not be distinguished from the header of a normal APDU. Instead, special parameters in the body 201 are used. The body of a misused APDU can for example contain impossible, totally unexpected and very improbable data for the instruction indicated in the header. In a variant embodiment, the indicated data length does not correspond to the length of the transmitted data. In another variant embodiment, the body 201 contains data for an instruction that does not require data.

These different embodiments can also be combined, for example by misusing both the header and the body. The one skilled in the art can also realize other possibilities to misuse an existing APDU in the framework of this invention.

The modified APDU handler 501 verifies whether the received APDU 20 has been misused in one of these ways and, if such a misuse has been detected, forwards this APDU to the new component G1, G2, G3 . . . . If parameters for the new component G1, G2, G3 . . . have been encoded in parameters of the misused APDU, a program provides the decoding. If no misuse is detected, the APDU is transmitted to a conventional component F1, F2 . . . .

The new components G1, G2, G3, . . . can be contained in the ROM 50 or in the EEPROM 51. Further components temporarily stored in the RAM 52 can also be made available. If the chip card 5 can play the role of master of the interface 4 at least temporarily, it can with this mechanism access also components, for example applets, that are made available by the mobile equipment 3. It is even possible for the APDU handler 501 to access components that are located in an external device connected with the mobile equipment 3, for example over a contactless interface, for example an infrared, RFID or Bluetooth interface.

This variant embodiment illustrated in FIG. 3 enables the application 1 and the mobile equipment 3 to access components G1, G2, G3 of the chip card 5 without having to standardize to this effect new APDU in the API interface 4. However, this variant embodiment has the disadvantage that the misused APDU and the accordingly called-up components have to be defined already before the manufacturing of the APDU handler 501 in the ROM part 50. After the cards have been distributed, at most alterations in the components G3 contained in the EEPROM 51, in the RAM 52 or in the mobile equipment 3 and called-up through this misused APDU can be made.

Figure 4:
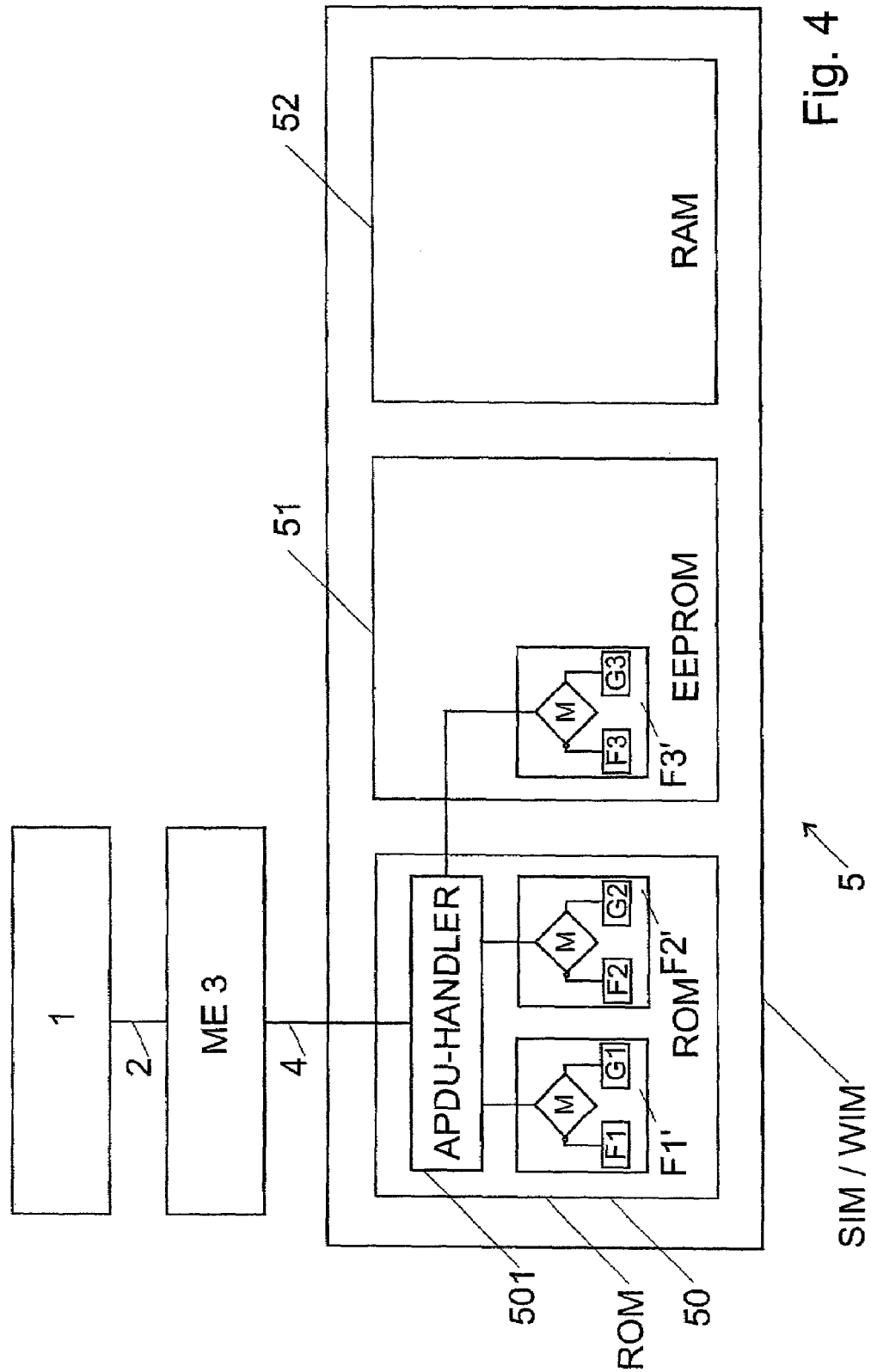
FIG. 4 shows a diagrammatic view of a system with a chip card according to a second embodiment of the invention.

FIG. 4 shows another variant embodiment of the invention, in which the APDU handler 500 requires no adaptation compared with FIG. 1. Like in a conventional chip card 5 according to FIG. 1, it forwards the received APDU to components, these components being contained in the ROM 50 or also in the EEPROM 51.

In these components F1', F2', . . . a test is run to verify whether the data units received by the APDU handler 500 have been misused in the aforementioned manner (misuse test m). If this is not the case, the APDU is transmitted to a conventional component. If a misuse has been detected, the data unit is forwarded to a new component G1, G2, G3 . . . . It will be understood that the normal component F1, F2, . . . , called-up by a not misused APDU, as well as the new component G1, G2, . . . , used only in the case of a misused APDU, can be located in other storage areas 50, 51, 52, 3. In this manner, a component F3' located in the EEPROM 51 can for example be redefined to access a component in the ROM 50 if it receives a misused APDU.

Figure 5:
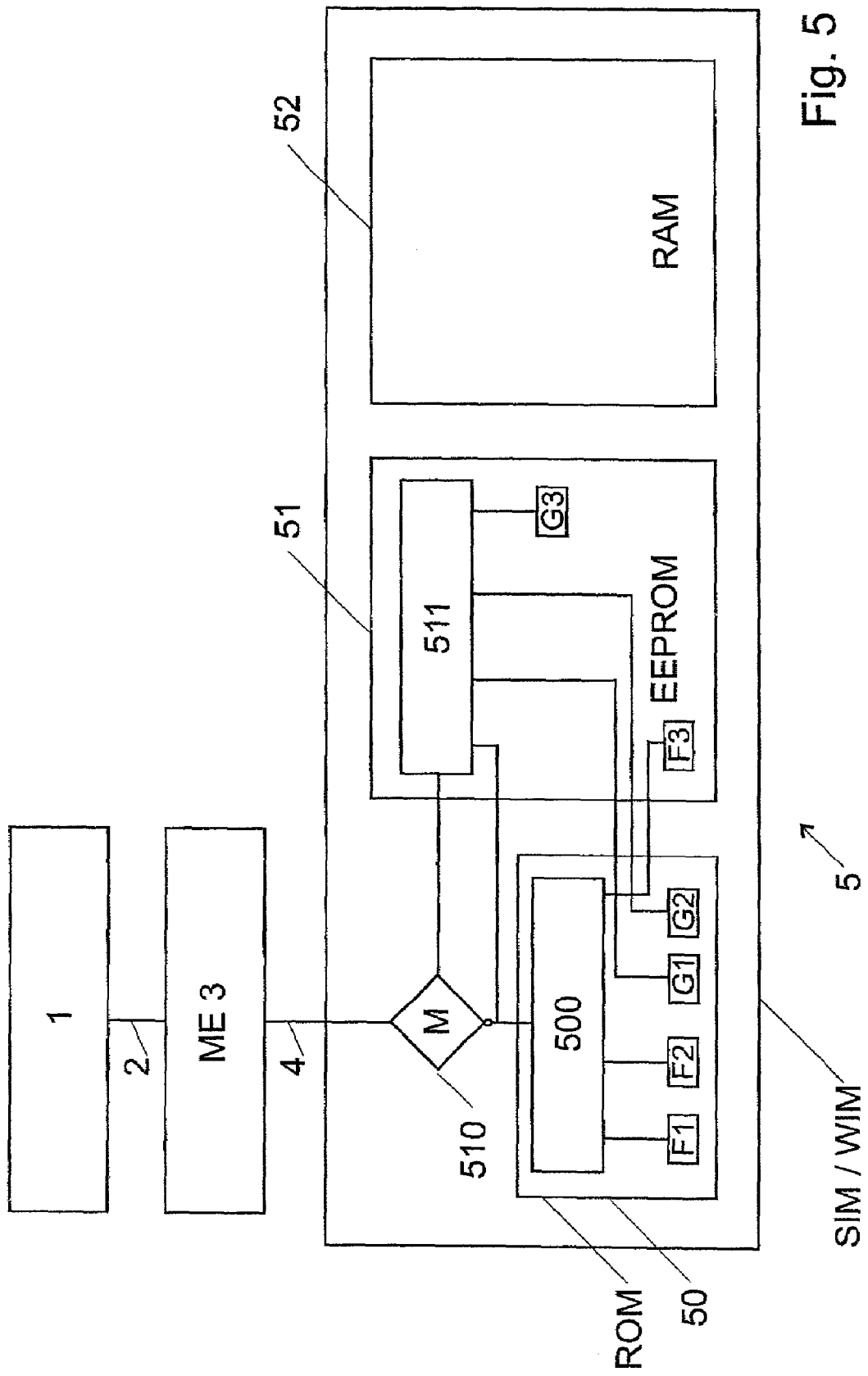
FIG. 5 shows a diagrammatic view of a system with a chip card according to a third embodiment of the invention.

FIG. 5 shows a further variant embodiment of the invention, in which a module 510 verifies all the APDU 20 received over the API interface 4 as to whether they have been misused. If no misuse has been detected, the APDU is forwarded to a conventional APDU handler 500 that transmits this APDU to a conventional component F1, F2, F3, . . . . If an APDU misuse has been detected by the module 510, the misused APDU is forwarded to a new, modified APDU handler 511 that calls up the component G1, G2, G3 . . . provided for this misused APDU.

The new APDU handler 511 is preferably located in the EEPROM 51. In this manner, it can also be altered after the manufacture of the ROM 50, in order for example to ensure access to new components G1, G2, G3 that have meanwhile been implemented. Preferably, the test module 510 is also located in the EEPROM so that new types of APDU misuses can be detected after the manufacture of the ROM, for example during the personalization or even after the distribution of the chip cards. The test module 510 could however also be located in the ROM 50 or even in the RAM 52.

FIG. 6 shows a further variant embodiment of the chip card according to the invention, in which the normal APDU handler usually located in the ROM 50 has been replaced with a modified APDU handler 512 in the EEPROM. Additionally, the APDU handler 512 can detect potential APDU misuses and in this case call up another component G1, G2, G3, . . . . This variant embodiment allows a great flexibility, since new components G1, G2, G3 and new types of misuses can be implemented at any time in the card 5.

In a variant embodiment, not represented, the modified APDU handler is also located in the RAM 52 so that it can easily be modified through the chip card's operating system or through the application 1.

An example of the calling-up of a component through an APDU misuse will now be described in further detail.

An application program 1, for example a browser in a WAP-capable mobile radio telephone, wants to encrypt a data T with a key P from a WIM card 5. The application 1 wants to have the encryption function R=V(T,P) executed by the mobile equipment 3 and expect from the mobile equipment 3 that it replies with the data R encrypted by the WIM card 5.

The WIM card manufacturer has implemented the necessary components, among others the key P and an encryption component G1, G2, G3 (for example a JAVA applet in the EEPROM 51), in the card 5. No APDU has however been defined over the API 4 allowing an access on these present encryption component, so that the mobile equipment 3 cannot execute this encryption function.

In order nevertheless to access this component, the application 1 can request the execution of another function, for which an APDU 20 for the interface 4 has been standardized. For example, the application 1 can have the signing function R=S(T,P) executed in which T corresponds to the data to be signed, P the signing parameters (for example the key to be used) and R the signed data.

In order for the chip card 5 to recognize that it has to encrypt and not sign the data T, the application 1 must use special parameters P for the function F, for example impossible, unexpected and/or very improbable parameters P. Parameters can also be indicated, if no parameter is required for a certain function, or parameters of the wrong type can be used.

The application 1 must furthermore convert the parameter T for the new encryption function and package this parameter T for example in a misused parameter T, P of the signing function.

The mobile equipment 3 that receives the APDU received by the application 1 with a signing order, transmits it to the card 5. The chip card 5 then receives this APDU over the API interface 4 and can recognize with the above described mechanism that the APDU has been misused and that the indicated parameters P1, P2 and/or the body 201 pertain to special criteria that would never (or extremely rarely) concern this APDU in the case of a normal use. As described above, the chip card in this case will have another function G1, G2, G3 (here an encryption function) be executed as if these criteria had not been fulfilled.

The called-up component G1, G2 or G3 can convert the parameter T and encrypt this data. The encrypted data is then transmitted with another APDU over the interface 4 and over the mobile equipment 3 to the application 1.

In this manner, an application 1 can access components of a chip card 5 that were not provided at the time of manufacture of the card and for which no APDU has been standardized, for example components G1, G2, G3 . . . that were downloaded as applet over an air interface during the personalization or even after the distribution of the card.

In a variant embodiment of the invention, each APDU can trigger the execution of several different functions in the chip card 5. A special misused APDU defines in which state the card is and which set of functions is to be used in future. This variant allows for several or all components of the chip card to be replaced by sending a single misused APDU. In this manner, for example, all parameters and components stored in the ROM 50 can temporarily be replaced. Another misused APDU can then return the chip card to its normal state.

The one skilled in the art will further understand that not only the applications 1 executed in the mobile equipment 3 can access additional components G1, G2, G3, . . . of the chip card 5 with the method according to the invention, but that also other devices can misuse standardized APDU, for example over a mobile radio network, over WAP and/or over a contacless interface at close range, for example infrared, RFID and/or Bluetooth interface, to access these new components.

Additionally, the invention also concerns applications 1 that misuse functions in order to access otherwise inaccessible components of a chip card as well as an equipment 3 comprising the following features:

a storage area, not represented, data processing means, not represented, that can access said storage area, a program being contained in said storage area that can be executed by said data processing means, a chip card reader, not represented, with which orders can be sent over a standardized API interface to a chip card 5, said program containing instructions for triggering the sending of at least one misused data unit in order to access components in the chip card for which no standardized order has been provided in the API interface between the chip card and the external device.

The invention claimed is:

1. A method with which a first application can access components of a second application over a logical interface, if no standardized data unit has been defined in said logical interface, said method comprising the steps of:

said first application sending an intentionally misused standardized data unit to said second application;

said second application recognizing when said data unit has been misused and accordingly making a second set of components available; and said application recognizing when a properly used data unit is received and accordingly making a first set of components available, wherein at least one component of said second set of components is not found in said first set of components.

2. The method of claim 1, said second application accomplishing said recognizing, on the basis of a header of the data unit.

3. The method of claim 2, said header comprising at least the following bytes:

at least one byte indicating a data unit class, at least one byte indicating an instruction that is to be executed, and at least two bytes corresponding to at least two parameters for the instruction to be executed.

4. The method of claim 1, wherein said second application accomplishes said recognizing, on the basis of a body of the data unit.

5. The method of claim 1, said logical interface being an API interface over which APDU orders are transmitted.

6. The method of claim 1, wherein said second application is made available by a chip card.

7. The method of claim 6, wherein said chip card is a SIM card.

8. The method of claim 6, wherein said chip card is a WIM card.

9. The method of claim 6, said chip card including a modified APDU handler that recognizes the received misused data units and forwards them to an appropriate component in said chip card.

10. The method of claim 9, said modified APDU handler being stored in a ROM.

11. The method of claim 9, said modified APDU handler being stored in an EEPROM.

12. The method of claim 1, the misuse of data units being recognized by the corresponding components.

13. The method of claim 1, the misuse of data units being recognized by a test module that forwards said data unit to a first APDU handler if no misuse has been detected and to a second APDU handler if a misuse has been detected.

14. The method of claim 13, said test module being stored in a ROM.

15. The method of claim 13, said test module being stored in an EEPROM.

16. The method of claim 1, said new component consisting of a program in an EEPROM.

17. The method of claim 1, said new component consisting of a program in a RAM.

18. The method of claim 1, said new component consisting of a program in an external device.

19. The method of claim 1, said new component consisting of a program in a second external device that communicates over a contactless interface.

20. A chip card comprising:

an interface for communicating with an external device over a logical interface, standardized data units being defined for this communication, and a data handler for recognizing properly used and intentionally misused standardized data units and for making one component available if said properly used data units are recognized and making another component available if misused data units have been recognized.

21. The chip card of claim 20, wherein said recognizing is on the basis of a header of the data unit that the data unit has been misused.

22. The chip card of claim 21, wherein said header comprises at least the following bytes:

at least one byte indicating a data unit class, at least one byte indicating an instruction that is to be executed, and at least two bytes corresponding to at least two parameters for the instruction to be executed.

23. The chip card of claim 20, capable of recognizing, on the basis of a body of the data unit, that the data unit has been misused.

24. The chip card of claim 20, said logical interface being an API interface.

25. The chip card of claim 24, being a SIM card.

26. The chip card of claim 24, being a WIM card.

27. The chip card of claim 20, wherein said data handler is a modified APDU handler that recognizes received misused data units and forwards them to an appropriate component in said chip card.

28. The chip card of claim 27, said modified APDU handler being stored in a ROM.

29. The chip card of claim 27, said modified APDU handler being stored in an EEPROM.

30. The chip card of claim 20, the misuse of data units being recognized by a corresponding component.

31. The chip card of claim 20, the misuse of data units being recognized by a test module that forwards said data unit to a first APDU handler if no misuse has been detected and to a second APDU handler if a misuse has been detected.

32. The chip card of claim 31, said test module being stored in a ROM.

33. The chip card of claim 31, said test module being stored in an EEPROM.

34. The chip card of claim 20, wherein said new component is stored in an EEPROM.

35. The chip card of claim 20, said new component being stored in a RAM.

36. A device comprising
   a storage area,
   data processing means that can access said storage area, wherein said storage area stores a program that can be executed by said data processing means,
   a chip card reader for sending orders over a standardized API interface to a chip card, wherein
   said program contains instructions for triggering the sending of at least one intentionally misused data unit in order to access at least one component in the chip card for which no standardized order has been provided in the API interface between the chip card and the external device.

37. A method with which a first application can access at least one new component of a second application over a logical interface, if no standardized data unit has been defined in said logical interface, said method comprising the steps of:
   said first application sending a standardized data unit to said second application, wherein one or both of a header and a body of said standardized data unit has been intentionally formatted contrary to the standard applied to the standardized data unit;
   said second application recognizing whether one or both of said one or both of said header and said body has been contrarily formatted and accordingly making said at least one new component available, wherein
   said second application recognizes when one or both of said one or both of said header and said body has been properly formatted and accordingly does not make said at least one new component available.

38. The method of claim 37, wherein said header is contrarily formatted and said header comprises:
   a portion indicating a data unit class,
   a portion indicating an instruction that is to be executed, and
   a portion corresponding to at least two parameters for an instruction to be executed.

39. The method of claim 37, wherein one or both of said first application and said second application is an APDU handler, and said standard is an APDU standard.

40. A device for communicating with an external device over a logical interface, said device comprising:
   an interface for communicating with the external device over the logical interface, wherein standardized data units are defined for said communication according to a standard, and
   a data handler for recognizing whether one or both of a header and a body of said standardized data unit has been intentionally formatted contrary to the standard, and for making one component available if properly formatted standardized data units have been recognized, and for making another component available if such contrarily formatted data units have been recognized.

41. The device of claim 40, wherein said header is contrarily formatted and said header comprises:
   a portion indicating a data unit class,
   a portion indicating an instruction that is to be executed, and
   a portion corresponding to at least two parameters for an instruction to be executed.

42. The device of claim 40, wherein said data handler is an APDU handler, and said standard is an APDU standard.

43. A device for communicating with an external device over a logical interface, said device comprising:
   one or more components;
   one or more additional components provided subsequently to said one or more components;
   an interface for communicating with said external device over the logical interface, wherein standardized data units are defined for said communication according to a standard; and
   a data handler for recognizing whether said standardized data unit has been formatted according to, or intentionally formatted contrary to, the standard, wherein
   at least a portion of said data unit is routed by said data handler to one or more of said one or more components if said data unit is formatted according to the standard, and wherein
   at least a portion of said data unit is instead routed by said data handler to one or more of said one or more additional components if said data unit is formatted contrary to the standard.

44. The device of claim 43, wherein said one or more additional components are components added on to said device after the manufacture of said device, and wherein said one or more additional components are components that utilize a different or an updated standard.

45. The device of claim 43, wherein said one or more additional components are a plurality of additional components, and wherein, if said data unit is formatted contrary to the standard, said at least a portion of said data unit is routed to said one or more of said plurality of additional components based on a content of said data unit interpreted by said data handler.

46. A method for implementing a set of new components without updating an APDU handler, said method comprising the steps of:
   providing a first set of components adapted to be accessed using a standardized APDU formatted according to a first APDU standard, each one of said first set of components for providing an associated desired functionality to a device;
   providing the APDU handler adapted for handling an APDU formatted according to the first APDU standard, but not formatted for handling an APDU according to a second APDU standard that is a later update to the first APDU standard;
   subsequent to providing the APDU handler, providing a second set of components adapted to be accessed using the second APDU standard, said second set of components being provided subsequent to providing said APDU handler, each one of said second set of components for providing an additional associated desired functionality to the device;
   providing an application adapted for providing the standardized APDU for use by said APDU handler for calling one or more of said first set of components;
   said application also being adapted for intentionally misusing an APDU in a manner contrary to the first APDU standard to provide an intentionally misused APDU that is associated with said second set of components;
   said application being further adapted for sending both a standardized APDU and said intentionally misused APDU to said APDU handler;
   said APDU handler determining whether it has received said standardized APDU and whether it has received said misused APDU;
   if said APDU has been determined by said APDU handler as not being intentionally misused, said APDU handler analyzing said APDU and calling one or more of said first set of components for execution based on said analysis;

if said data unit has been determined as having been intentionally misused, said APDU handler analyzing said misused APDU and calling one or more of said second set of components for execution based on said analysis, wherein said one or more of said second set of components is different than said one or more of said first set of components.

47. The method of claim 46, said APDU hander determining misuse on the basis of a header of the data unit.

48. The method of claim 47, said header comprising at least the following bytes:
at least one byte indicating a data unit class,
at least one byte indicating an instruction that is to be executed, and
at least two bytes corresponding to at least two parameters for the instruction to be executed.

49. The method of claim 46, wherein said APDU handler determines misuse on the basis of a body of the data unit.

50. The method of claim 46, wherein said APDU handler is provided on a chip card.

51. The method of claim 50, said APDU handler adapted for determining the misused APDU and forwarding them to said one or more of said second components also provided on said chip card.

52. The method of claim 46, the misuse of data units being recognized by the corresponding components.

53. The method of claim 46, wherein said APDU handler is comprised of a test module, a first application, and a second APDU application, wherein the misuse of data units is determined by the test module that forwards said data unit to the first APDU application if no misuse has been determined and to the second APDU application if a misuse has been determined.

54. The method of claim 46, said second set of components including a program in an external device.

55. The method of claim 46, said second set of components including a program in a second external device that communicates over a contactless interface.

56. A device comprising:
means for storing and executing a first set of components adapted to be accessed using a standardized APDU formatted according to a first APDU standard, each one of said first set of components for providing an associated desired functionality to said device;
means for storing and executing the APDU handler, said APDU handler being adapted for handling an APDU formatted according to the first APDU standard, but not formatted for handling an APDU according to a second APDU standard that is a later update to the first APDU standard;
means for storing and executing, subsequent to storing the APDU handler, a second set of components adapted to be accessed using the second APDU standard, each one of said second set of components for providing an additional associated desired functionality to said device;
means for storing and executing an application, said application being adapted for, when executed:
providing the standardized APDU for use by said APDU handler for calling one or more of said first set of components,
intentionally misusing an APDU in a manner contrary to the first APDU standard to provide an intentionally misused APDU that is associated with said second set of components, and
sending both a standardized APDU and said intentionally misused APDU to said APDU handler;
said APDU handler being further adapted for, when executed, determining whether it has received said standardized APDU and whether it has received said misused APDU, wherein
if said APDU has been determined by said APDU handler as not being intentionally misused, said APDU handler analyzes said APDU and calls one or more of said first set of components for execution based on the analysis, and wherein
if said data unit has been determined as having been intentionally misused, said APDU handler analyzes said misused APDU and calls one or more of said second set of components for execution based on said analysis.

* * * * *

UNITED STATES PATENT AND TRADEMARK OFFICE
CERTIFICATE OF CORRECTION

PATENT NO.       : 7,606,931 B2                                                                 Page 1 of 1
APPLICATION NO. : 10/150210
DATED            : October 20, 2009
INVENTOR(S)      : Adriano Huber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1826 days.

Signed and Sealed this

Twelfth Day of October, 2010

David J. Kappos
*Director of the United States Patent and Trademark Office*